United States Patent [19]
Garner et al.

[11] 3,836,382
[45] Sept. 17, 1974

[54] PRESSURE-SENSITIVE COPYING MATERIAL

[75] Inventors: Robert Garner, Bury; Hans Rudolf Bolliger, Mere, both of England

[73] Assignee: Ciba-Geigy AG, Basle, Switzerland

[22] Filed: Aug. 30, 1972

[21] Appl. No.: 284,808

[30] Foreign Application Priority Data
Sept. 21, 1971 Great Britain .................... 439/71

[52] U.S. Cl. .................... 117/36.2, 117/36.8
[51] Int. Cl. .................... B41c 1/06, B41m 5/00
[58] Field of Search ............ 117/36.8, 36.2; 96/75

[56] References Cited
UNITED STATES PATENTS

| | | | |
|---|---|---|---|
| 2,995,465 | 8/1961 | Richey | 117/36.8 |
| 3,076,707 | 2/1963 | Lawton et al. | 96/75 |
| 3,427,180 | 2/1969 | Phillips | 117/36.2 |
| 3,432,327 | 3/1969 | Masao Kan et al. | 117/36.8 X |
| 3,516,846 | 6/1970 | Matson | 117/36.2 |

*Primary Examiner*—Thomas J. Herbert, Jr.
*Attorney, Agent, or Firm*—Joseph G. Kolodny; Edward McC. Roberts; Prabodh I. Almaula

[57] ABSTRACT

A pressure-sensitive copying material including at least one pair of sheets, which comprises at least a colour former dissolved in an organic solvent preferably contained in pressure-rupturable microcapsules, an azo coupling component and a solid electron accepting substance, said colour former, upon coming into contact with the azo coupling component and the solid electron accepting substance by azo coupling being able to produce a coloured marking at the points where the pressure is applied, wherein the colour former is a triazen of the formula

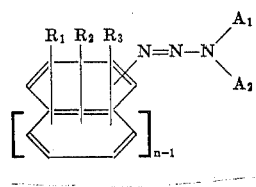

in which $R_1$, $R_2$ and $R_3$ each is hydrogen, alkyl, substituted alkyl, alkoxy, halogen. nitro, acylamino, aminoacyl or alkoxy-carbonyl, $A_1$ and $A_2$ each is alkyl or phenyl or $A_1$ and $A_2$ together with the nitrogen atom form a heterocyclic ring system and $n$ is 1 or 2.

15 Claims, No Drawings

PRESSURE-SENSITIVE COPYING MATERIAL

The object of the invention is a pressure-sensitive copying material including at least one pair of sheets, which comprises at least a colour former dissolved in an organic solvent preferably contained in pressure-rupturable microcapsules, an azo coupling component and a solid electron accepting substance, said colour former, upon coming into contact with the azo coupling component and the solid electron accepting substance by azo coupling being able to produce a coloured marking at the points where the pressure is applied, wherein the colour former is a triazen of the formula (1) 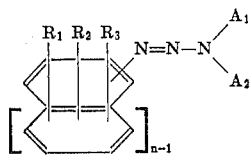

in which $R_1$, $R_2$ and $R_3$ each is hydrogen, alkyl, substituted alkyl, alkoxy, halogen, nitro, acylamino, aminoacyl or alkoxy-carbonyl, $A_1$ and $A_2$ each is alkyl or phenyl or $A_1$ and $A_2$ together with the nitrogen atom form a heterocyclic ring system and $n$ is 1 or 2.

Alkyl and alkoxy in the definitions of $R_1$, $R_2$, $R_3$, $A_1$ and $A_2$ usually are lower alkyl or alkoxy, which as a rule do not contain more than four carbon atoms, e.g. n-butyl, n-butoxy, n-propyl, isopropyl, ethyl, ethoxy, methyl or methoxy. Substituents for alkyl in $R_1$, $R_2$ or $R_3$ e.g. are halogen, hydroxy or lower alkoxy.

Halogen in each occurence preferably stands for iodine or especially bromine and chlorine. The term acylamino preferably means a radical of an aliphatic or aromatic sulfonic or particularly carboxylic acid amide whereby the amide nitrogen may be substituted by lower alkyl. Especially radicals of an alkane carboxylic acid amide, where the amide nitrogen optionally is substituted by methyl, such as a formic acid amide, acetic acid amide or propionic acid amide radical or radicals of a benzene carboxylic acid amide such as benzoic acid amide are preferred.

The term aminoacyl as a rule stands for an amine substituted —CO— or —SO$_2$— group. The amine radical thereby may be of a primary or secondary aliphatic or an heterocyclic amine. Prefered triazenes correspond to the formula (2) 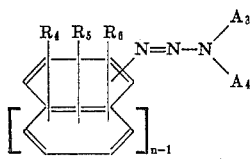

in which $R_4$, $R_5$ and $R_6$ each is hydrogen, alkyl with one to four carbon atoms, alkoxy with one to four carbon atoms, halogen, nitro, —N(—X$_1$)—CO—X$_2$ or

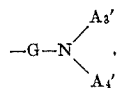

or COOX$_3$, X$_1$ and X$_2$ each is hydrogen, alkyl with one to four carbon atoms or phenyl, X$_3$ is alkyl with one to four carbon atoms, G is —CO— or —SO$_2$—, A$_3$, A$_4$, A$_3'$ and A$_4'$ each is alkyl with one to four carbon atoms or phenyl or A$_3$ and A$_4$, and A$_3'$ and A$_4'$ respectively together with the nitrogen atom for a heterocyclic ring system with one or two rings, each ring containing five to seven ring members and $n$ is 1 or 2.

Of special interest is a pressure-sensitive copying material, wherein the colour former is a triazen of the formula (3) 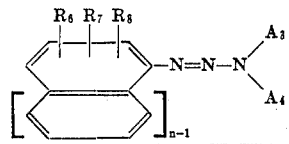

in which $R_7$ and $R_8$ each is hydrogen, alkyl with one to four carbon atoms, alkoxy with one to four carbon atoms or halogen, and $R_6$, $A_3$, $A_4$ and n have the given meaning.

Advantageous result are obtained with a pressure-sensitive copying material, wherein the colour former is a triazen of the formula (4) 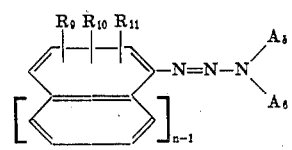

in which $R_9$ is hydrogen, alkyl with one or two carbon atoms, alkoxy with one or two carbon atoms, halogen, nitro, —N(—X$_4$)—CO—X$_5$,

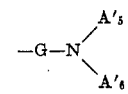

or —COOX$_6$, X$_4$ is hydrogen, alkyl with one or two carbon atoms or phenyl, X$_5$ is alkyl with one or two carbon atoms, X$_6$ is alkyl with one or two carbon atoms or phenyl, $R_{10}$ and $R_{11}$ each is hydrogen, alkyl with one or two carbon atoms, alkoxy with one or two carbon atoms or halogen, G is —CO— or —SO$_2$—; A$_5$, A$_6$, A$_5'$ and A$_6'$ each is alkyl with one or two carbon atoms or phenyl or A$_5$ and A$_6$ and A$_5'$ and A$_6'$ respectively together with the nitrogen atom form a heterocyclic ring system with one or two rings consisting of carbon, nitrogen and at most one oxygen as ring members, each ring containing five to seven ring members and the ring system containing at most 10 ring members.

Very suitable pressure-sensitive copying material contain as the colour former a triazen of the formula (5) 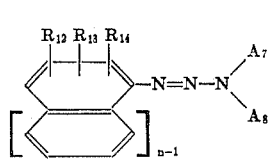

in which $R_{12}$ is hydrogen, methyl, methoxy, chlorine, nitro,

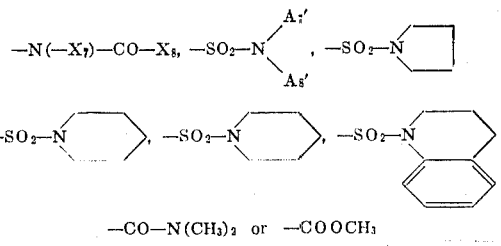

—CO—N(CH$_3$)$_2$ or —COOCH$_3$ $R_{13}$ is hydrogen, methyl, methoxy or chlorine
$R_{14}$ is hydrogen or methoxy
$A_7'$ is methyl, ethyl or phenyl,
$A_8'$ is methyl, ethyl or hydrogen,
$A_7$ is methyl, ethyl or phenyl,
$A_8$ is methyl or ethyl or $A_7$ and $A_8$ together with the nitrogen atom are

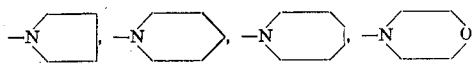

$X_7$ is hydrogen or methyl, $X_8$ is methyl or phenyl and $n$ is 1 or 2.

These colour formers as such either are well known or may be prepared by conventional methods known in the art. A general method e.g. can be described thus:

The primary aromatic amine is dissolved in hydrochloric acid and water, then the solution is cooled to 0°C with ice. Sodium nitrite is added beneath the surface at such a rate that a slight excess of nitrous acid is always present. When the diazotisation is complete the reaction mixture is added to a solution or suspension of the secondary amine and sodium hydrogen carbonate in water at 10°C. The reaction mixture is stirred and allowed to reach room temperature. Stirring is continued until no diazonium compound can be detected. The product is out of solution and is filtered off or extracted into an organic solvent, washed with water and dried in vacuo at temperature below 50°C.

The colour formers as such are colourless and can form coloured images when brought into contact with a typical azoic coupling substance and an acidic active substrate, that is a solid electron coupling substance.

Suitable colour formers of the formula (I) e.g. are:

TABLE I

| No. | $R_1$ | $R_2$ | $R_3$ | $n$ | Position —N=N— | $A_1$ | $A_2$ |
|---|---|---|---|---|---|---|---|
| 6.1 | 3-SO$_2$N(CH$_3$)$_2$ | 4-CH$_3$ | II | I | I | —CH$_3$ | —CH$_3$ |
| 6.2 | = | | | | | —C$_2$H$_5$ | —C$_2$H$_5$ |
| 6.3 | | | | | | pyrrolidino | |
| 6.4 | | | | | | piperidino | |
| 6.5 | | | | | | | |
| 6.6 | | | | | | morpholino | |
| 6.7 | 3-SO$_2$N(C$_2$H$_5$)$_2$ | | | | | —CH$_3$ | —CH$_3$ |
| 6.8 | | | | | | pyrrolidino | |
| 6.9 | | | | | | piperidino | |
| 6.10 | | | | | | | |
| 6.11 | 3-SO$_2$—N pyrrolidino | | | | | —CH$_3$ | —CH$_3$ |
| 6.12 | | | | | | pyrrolidino | |
| 6.13 | | | | | | piperidino | |
| 6.14 | | | | | | | |
| 6.15 | | | | | | morpholino | |
| 6.16 | 3-SO$_2$—N piperidino | | | | | —CH$_3$ | —CH$_3$ |
| 6.17 | | | | | | pyrrolidino | |
| 6.18 | | | | | | piperidino | |
| 6.19 | | | | | | | |
| 6.20 | | | | | | morpholino | |

TABLE I—Continued

| No. | R₁ | R₂ | R₃ | n | Position —N=N— | A₁ | A₂ |
|---|---|---|---|---|---|---|---|
| 6.21 | 3-SO₂—N⟨piperidine⟩ | 4-CH₃ | H | 1 | 1 | —CH₃ | —CH₃ |
| 6.22 | | | | | | | ⟨pyrrolidine⟩ |
| 6.23 | | | | | | | ⟨piperidine⟩ |
| 6.24 | | | | | | | ⟨hexamethyleneimine⟩ |
| 6.25 | | | | | | | ⟨morpholine⟩ |
| 6.26 | 3-SO₂—NH—C₆H₅ | | | | | | ⟨piperidine⟩ |
| 6.27 | 3-SO₂—N(CH₃)(C₆H₅) | | | | | —CH₃ | —CH₃ |
| 6.28 | | | | | | | ⟨pyrrolidine⟩ |
| 6.29 | | | | | | | ⟨piperidine⟩ |
| 6.30 | | | | | | | ⟨hexamethyleneimine⟩ |
| 6.31 | | | | | | | ⟨morpholine⟩ |
| 6.32 | 3-SO₂—N(C₂H₅)(C₆H₅) | | | | | | ⟨piperidine⟩ |
| 6.33 | 3-SO₂—N⟨tetrahydroquinoline⟩ | | | | | —CH₃ | —CH₃ |
| 6.34 | | | | | | —C₂H₅ | —C₂H₅ |
| 6.35 | | | | | | | ⟨pyrrolidine⟩ |
| 6.36 | | | | | | | ⟨piperidine⟩ |
| 6.37 | | | | | | | ⟨morpholine⟩ |
| 6.38 | 4-N(CO—CH₃)(CH₃) | H | | | | | ⟨piperidine⟩ |
| 6.39 | 4-NH—CO—C₆H₅ | 2-OCH₃ | 5-OCH₃ | | | | |
| 6.40 | 4-CO—N(CH₃)(CH₃) | H | H | | | | |
| 6.41 | 2-COOCH₃ | | | | | | |
| 6.42 | 4-NO₂ | H | H | 1 | 1 | | ⟨piperidine⟩ |
| 6.43 | 4-Cl | 2-CH₃ | | | | | |
| 6.44 | 5-OCH₃ | 2-OCH₃ | | | | | |
| 6.45 | 4-OCH₃ | | | | | | |
| 6.46 | | | 5-Cl | | | | |
| 6.47 | 4-SO₂N(C₂H₅) | H | H | | | | |
| 6.48 | 4-SO₂—N⟨piperidine⟩ | | | | | | |
| 6.49 | 2-SO₂N(C₂H₅)(C₆H₅) | | | | | | |

TABLE I—Continued

Symbols in Formula (I)

| No. | $R_1$ | $R_2$ | $R_3$ | $n$ | Position —N=N.... | $A_1$ | $A_2$ |
|---|---|---|---|---|---|---|---|
| 6.50 | 3-SO$_2$—N⟨⟩ | | | | | | |
| 6.51 | 5-SO$_2$N(C$_2$H$_5$)$_2$ | 2-OCH$_3$ | | | | | |
| 6.52 | | | | | ⟨⟩ | | |
| 6.53 | 4-Cl | 2-CH$_3$ | | | | —CH$_3$ | —C$_6$H$_5$ |
| 6.54 | 4-OCH$_3$ | 2-OCH$_3$ | | | | | |
| 6.55 | 5-OCH$_3$ | | | | | | |
| 6.56 | 5-Cl | 2-Cl | | | | | |
| 6.57 | | 2-CH$_3$ | | | | | |
| 6.58 | 4-SO$_2$N(C$_2$H$_5$)$_2$ | H | | | | —CH$_3$ | —CH$_3$ |
| 6.59 | 4-SO$_2$—N⟨⟩ | | | | | | |
| 6.60 | 5-SO$_2$—N(C$_2$H$_5$)$_2$ | | | | | —C$_2$H$_5$ | —C$_2$H$_5$ |
| 6.61 | —H | | | 2 | | ⟨⟩ | |
| 6.62 | 5-SO$_2$—N(C$_2$H$_5$)$_2$ | | | | | | |
| 6.63 | 4-SO$_2$—N⟨⟩ | | | | | | |
| 6.64 | 6-SO$_2$—N⟨⟩ | | | | | | |
| 6.65 | 5-SO$_2$—N(C$_2$H$_5$)$_2$ | | | | | | |
| 6.66 | 5-SO$_2$—N(C$_2$H$_5$)$_2$ | | | | | —CH$_3$ | —CH$_3$ |

In the present pressure-sensitive copying material the azo coupling component preferably is a naphthalene, benzene, pyrazolone or quinoline or more particularly a naphthol or a naphthylamine.

Among the naphthol those of the formula (6)

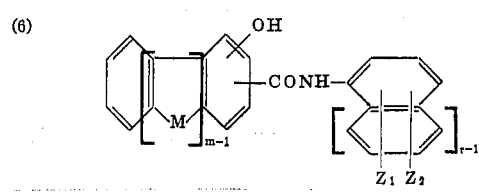

are of special interest, in which M is —NH—, —S— or —O—, $Z_1$ and $Z_2$ each is hydrogen, nitro, halogen. alkyl with one to four carbon atoms or alkoxy with one to four carbon atoms, $m$ and $r$ each is 1 or 2.

Naphthylamines which are very valuable correspond to the formula (7)

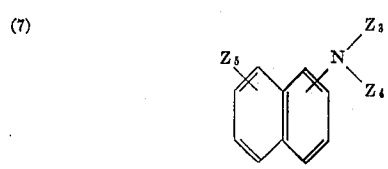

in which $Z_3$ and $Z_4$ each is hydrogen, alkyl with one to four carbon atoms, benzyl or phenyl or where $Z_3$, $Z_4$ and the nitrogen atom together form a heterocyclic ring system with one or two rings consisting of carbon, nitrogen and at most one oxygen as ring members, each ring containing five to seven ring members and the ring system containing at most 10 ring members and $Z_5$ is hydrogen or a sulfonic acid groups.

All the azo couplers suitable for the present pressure-sensitive material are of the well known couplers used for making azo dyestuffs and they thus are known as such and are prepared by well known methods.

The following naphthols of formula (6) e.g. are very suitable a coupling components:

Table 2

| No. | position of —OH | position of —CONH— | $m$ | $M$ | $r$ | $Z_1$ | $Z_2$ |
|---|---|---|---|---|---|---|---|
| 8.1 | 2 | 3 | 1 | — | 1 | H | H |
| 8.2 | 2 | 3 | 1 | — | 1 | 4—Cl | H |
| 8.3 | 2 | 3 | 1 | — | 1 | 4-Cl | 2-CH$_3$ |
| 8.4 | 2 | 3 | 1 | — | 1 | H | 2-OCH$_3$ |
| 8.5 | 2 | 3 | 1 | — | 1 | H | 2-CH$_3$ |
| 8.6 | 2 | 3 | 1 | — | 1 | 3-NO$_2$ | H |
| 8.7 | 2 | 3 | 1 | — | 1 | 5-OCH$_3$ | 2-OCH$_3$ |
| 8.8 | 2 | 3 | 1 | — | 1 | 4-OCH$_3$ | H |
| 8.9 | 2 | 3 | 1 | — | 1 | 4-OCH$_3$ | 3-Cl |
| 8.10 | 2 | 3 | 1 | — | 1 | 5-Cl | 2-CH$_3$ |
| 8.11 | 2 | 3 | 1 | — | 1 | 4-CH$_3$ | H |
| 8.12 | 3 | 4 | 2 | NH | 1 | 4-Cl | H |
| 8.13 | 2 | 3 | 2 | O | 1 | 5-OCH$_3$ | 2-OCH$_3$ |
| 8.14 | 2 | 3 | 1 | — | 2 | H | H |

Naphthylamines of formula (7) e.g. are:

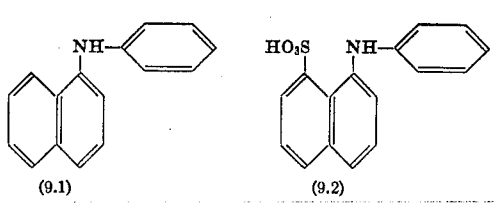

(9.1)   (9.2)

Further suitable azo couplers correspond to these formulae:

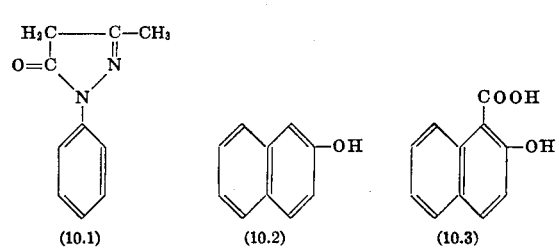

(10.1)   (10.2)   (10.3)

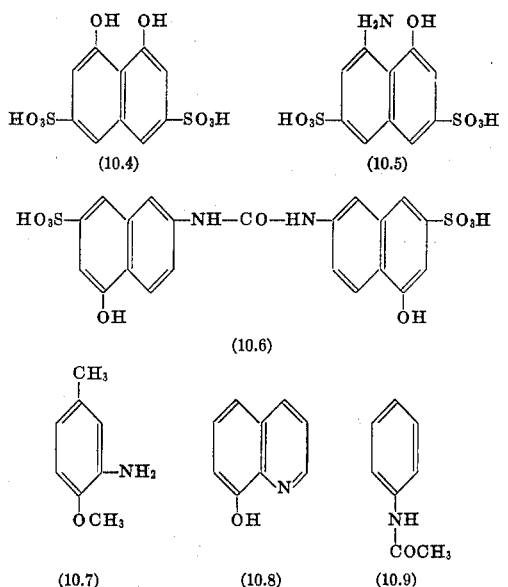

With these colours formers a large variety of colours may be produced ranging from orange to violet. Mixtures of such colour formers are suitable to give neutral shades such as grey. A special advantage of the present triazens is the light fastness of the colours they produce.

These colour formers which are comprised in the pressure sensitive copying material are being prevented from becoming active by being separated from the coupling components. As a rule this is done by incorporating these colour formers into a foam-, sponge- or honey-comb-like structure. Preferably however this colour formers are microencapsulated.

When these colourless colour formers of formula (1) now are dissolved in an organic solvent they may be subjected to a microencapsulation process and subsequently used for making pressure sensitive papers. When the capsules are ruptured by pressure from e.g. a pencil and the colour former solution is thus transferred into an adjacent sheet coated with a substrate capable of acting as an electron acceptor, and upon coupling of the diazonium compound thus formed with the azo coupling component a coloured image is produced. This new colour results from the thus produced azo dyestuff which absorbs in the visible region of the electromagnetic spectrum.

The general art of making microcapsules of some character has long been known. Well known methods e.g. are disclosed in U.S. Pat. Nos. 2,183,053, 2,800,457, 2,800,458, 3,265,630, 2,964,331, 3,418,656, 3,418,250, 3,016,308, 3,424,827, 3,427,250, 3,405,071, 3,171,878 and 2,797,201. Further methods are disclosed in British Pat. Nos. 989,264 and above all 1,156,725. Any of these and other methods are suitable for encapsulating the present colour formers.

Preferably the present colour formers are encapsulated as organic solutions thereof. Suitable solvents are preferably non-volatile e.g. polyhalogenated diphenyl such as trichlorodiphenyl and its mixture with liquid paraffin, tricresyl, phosphate, di-n-butyl phthalate, di-octyl phthalate, trichlorobenzene, nitrobenzene, trichloroethyl phosphate, petroleum-ether, hydrocarbon oils, such as paraffin, condensed derivatives of diphenyl or triphenyl, chlorinated or hydrogenated condensed aromatic hydrocarbons etc. The capsule walls preferably have been deposited by coacervation forces evenly around the droplets of the colour former solution, the encapsulating material consisting of gelatine, as e.g. described in U.S. Pat. No. 2,800,457.

Alternatively the capsules preferably may be made of aminoplast or modified aminoplasts by polycondensation as described in British Pat. Nos. 989,264 or 1,156,725.

The triazens can be micro-encapsulated on their own and allowed to react with a coupling component coated on the receiving sheet, or a mixture of triazen and coupling component can be microencapsulated together to form a coloured image on reacting with the solid electron accepting substance.

A preferred arrangement is wherein the encapsulated colour former is coated on the back side of a transfer sheet and the coupling component and the electron accepting substance are coated on the front side of a receiving sheet.

Another interesting system comprises the encapsulated colour former and the coupling component coated on the back side of a transfer sheet and the electron accepting substance coated on the front side of a receiving sheet.

Further systems are possible wherein both the colour former and the azo coupling component are encapsulated in capsules and coated together or separately on the back side of the transfer sheet.

In the systems wherein the coupler and the electron acceptor are on the front side of the receiving sheet, the coupler and the electron acceptor can be milled together before coupling and coated in one step, or these two components may be applied in two separate coating steps, in the latter case the coupler either may be coated encapsulated or as a solution. Preferably the coupler is not encapsulated and coated as a solution or milled together with the electron acceptor.

In another preferred material the present triazenes are co-encapsulated with one or more other known colour formers such as crystal violet lactone or indolyl red.

The preferred colour reactant that is electron acceptor is attapulgus clay or an acidic phenolic resin.

These electron acceptors preferably are coated on the front side of the receiving sheet.

The microcapsules containing the colour formers of formula (1) are used for making pressure-sensitive copying material of the various types known in the art, such as so called "Chemical Transfer," "Chemical Self-contained" and "Monoform" papers. The various systems mainly are distinguished by the arrangement of the capsules, the colour reactants and the support material.

The microcapsules may be in a undercoating of the upper sheet and the colour reactants, that is the electron acceptor and coupler, may be in the overcoating of the lower sheets. However, the components may also be used in the paper pulp. Such systems are called "Chemical Transfer" system.

Another arrangement we have in the self-contained papers. There the microcapsules containing the colour former and the colour reactants are in or on the same sheet as one or more individual coatings or in the paper pulp.

Such pressure sensitive copying materials are described e.g. in U.S. Pat. Nos. 3,516,846, 2,730,457, 2,932,582, 3,427,180, 3,418,250 and 3,418,656. Further systems are disclosed in British Pat. Nos. 1,042,597, 1,042,598, 1,042,596, 1,042,599, 1,053,935 and 1,517,650. Microcapsules containing the colour formers of formula (1) are suitable for any of these and other systems.

The capsules are preferably fixed to the carrier by means of a suitable adhesive. Since paper is the preferred carrier material, these adhesives are predominantly paper coating agents, such as e.g. gum arabic, polyvinyl alcohol, hydroxyethylcellulose, casein, methylcellulose or dextrin.

In the present application, the definition "paper" not only includes normal papers from cellulose fibres, but also papers in which the cellulose fibres are replaced (partially or completely) by synthetic fibres of polymers.

MANUFACTURING PROCEDURE

4-Methyl-3-piperidinosulphonylphenylazo-1-pyrrolidine:

4-Methyl-3-piperidinosulphonylaniline (25.4 g.) is dissolved in hydrochloric acid (d 1.14, 28.5 ml.) and water (100 ml) then the solution is cooled to 0°C with ice (150 g). 4N-Sodium nitrite (25 ml) is added under the surface during 2–3 minutes and the solution is stirred at 0°C for 30 minutes the diazo solution is then added to a solution of pyrrolidine (d 0.86, 8.3 ml) and sodium hydrogen carbonate (12.6 g.) in water (200 ml.) at 10°C. The reaction mixture is stirred for 2 hours at room temperature and the product, a buff coloured solid is filtered off, washed with water, and dried in vacuo at 40°C. Yield 27.6 g (82 percent) of colour former No. 6.17.

In an analogous manner the other triazenes of table I are prepared.

The following yields are obtained:

| Colour Former No. | % Yield |
| --- | --- |
| 6.1 | 97 |
| 6.2 | 73 |
| 6.3 | 97 |
| 6.4 | 86 |
| 6.5 | 46 |
| 6.6 | 61 |
| 6.7 | 85 |
| 6.8 | 97 |
| 6.9 | 84 |
| 6.10 | 76 |
| 6.11 | 56 |
| 6.12 | 84 |
| 6.13 | 73 |
| 6.14 | 29 |
| 6.15 | 75 |
| 6.16 | 87 |
| 6.17 | 82 |
| 6.18 | 65 |
| 6.19 | 66 |
| 6.20 | 92 |
| 6.21 | 64 |
| 6.22 | 72 |
| 6.23 | 62 |
| 6.24 | 73 |
| 6.25 | 75 |
| 6.26 | 84 |
| 6.27 | 66 |
| 6.28 | 84 |
| 6.29 | 57 |
| 6.30 | 59 |
| 6.31 | 81 |
| 6.33 | 82 |
| 6.34 | 74 |
| 6.35 | 67 |
| 6.36 | 59 |
| 6.37 | 80 |
| 6.38 | 94 |
| 6.40 | 89 |
| 6.43 | 88 |
| 6.44 | 84 |

In the following Example parts and percentages are by weight.

EXAMPLE 1

From colour former No. 6.66 of table 1 a 3 percent solution is prepared in trichlorodiphenyl. This solution is encapsulated in gelatine/gum arabic by known methods according to the coacervation process, namely:

10 parts of gelatine are dissolved in 90 parts of water, 100 parts of the above colour former solutions are added then a solution of 10 parts of gum arabic and 90 parts of water is added whilst stirring. Thus emulsion is poured out into 700 ml of water at 50°C whilst stirring. The subsequent curing takes place with 6 parts of glutardialdehyde at about 30°C.

After curing, 25 parts of polyvinyl alcohol are added and a paper sheet is thus coated with this aqueous suspension of the microcapsules containing the colour former solution. A second sheet, the receiving sheet, is coated with attapulgus clay mixed with 2.5 percent of coupler No. 8.11. The two sheets are put together, the two coatings facing each other. When by pressure of a ball-point pen, with which can be written on the uncoated side of the sheet carrying the microcapsules, the capsules are ruptured, the colour former solution is transferred imagewise onto the adjacent receiving sheet. The coupler and the triazene in the presence of the attapulgus clay react form an azo dyestuffs and a magenta coloured image is obtained, which is a fine copy of the original.

Corresponding copies can be obtained by using another colour former of table I and another coupler of table II and page 12. Depending on the colour former, the coupler and the electron acceptor used copies of different colours are obtained, namely:

| Colour Former No. | Coupler No. | Colour of image on attapulgus. |
| --- | --- | --- |
| 6.1 | 8.7 | orange-red |
| 6.2 | do. | do. |
| 6.3 | do. | do. |
| 6.4 | do. | do. |
| 6.5 | do. | do. |
| 6.6 | do. | do. |
| 6.7 | do. | do. |
| 6.8 | do. | do. |
| 6.9 | do. | do. |
| 6.10 | do. | do. |
| 6.11 | do. | do. |
| 6.12 | do. | do. |
| 6.13 | do. | do. |
| 6.14 | do. | do. |
| 6.15 | do. | do. |
| 6.16 | 8.7 | orange-red |
| 6.17 | do. | do. |
| 6.18 | do. | do. |
| 6.19 | do. | do. |
| 6.20 | do. | do. |
| 6.23 | do. | do. |
| 6.27 | do. | do. |
| 6.28 | do. | do. |
| 6.29 | do. | do. |
| 6.30 | do. | do. |
| 6.31 | do. | do. |
| 6.32 | 9.1 | violet |
| do. | 10.2 | yellowish red |
| do. | 10.7 | bluish red |
| do. | 9.2 | red |
| do. | 8.1 | red |
| do. | 8.7 | yellowish red |
| do. | 8.5 | yellowish red |
| do. | 8.8 | red |
| do. | 8.10 | red |
| 6.40 | 8.1 | red |
| do. | 8.2 | do. |
| do. | 8.3 | do. |
| do. | 8.4 | do. |
| do. | 8.5 | do. |

—Continued

| Colour Former No. | Coupler No. | Colour of image on attapulgus |
|---|---|---|
| 6.40 | 8.6 | red |
| do. | 8.7 | do. |
| do. | 8.8 | do. |
| do. | 8.9 | do. |
| do. | 8.10 | do. |
| do. | 8.11 | do. |
| do. | 8.14 | do. |
| do. | 10.6 | do. |
| 6.43 | 10.2 | orange |
| do. | 10.7 | do. |
| 6.44 | 10.2 | red |
| do. | 10.7 | do. |
| 6.48 | 8.7 | bluish red |
| 6.49 | do. | yellowish red |
| 6.50 | do. | red |
| 6.54 | 9.1 | violet |
| do. | 10.2 | yellowish red |
| do. | 10.7 | bluish red |
| do. | 9.2 | red |
| do. | 8.1 | do. |
| do. | 8.7 | yellowish red |
| do. | 8.5 | do. |
| do. | 8.8 | red |
| do. | 8.10 | do. |
| 6.55 | 9.1 | do. |
| 6.55 | 10.2 | violet |
| do. | 10.7 | bluish violet |
| do. | 9.2 | reddish grey |
| do. | 8.1 | violet |
| do. | 8.7 | do. |
| do. | 8.5 | grey-violet |
| do. | 8.8 | do. |
| do. | 8.10 | do. |
| 6.61 | 8.7 | purple |
| 6.62 | do. | red-violet |
| 6.63 | do. | do. |
| 6.64 | do. | do. |
| 6.65 | do. | do. |
| 6.66 | do. | do. |

EXAMPLE 2

The same procedure is followed as in Example 1, there are however used the following colour formers and couplers:

| Example No. | Colour Former No. | % | Coupler No. | % | Colour of image |
|---|---|---|---|---|---|
| 2.1 | 6.66 | 3 | 8.11 | 2.25 | red |
|  |  |  | 10.1 | 0.25 |  |
| 2.2 | 6.66 | 3 | 8.11 | 1.8 | orange |
|  |  |  | 10.9 | 0.6 |  |
| 2.3 | 6.66 | 3 | 10.1 | 2.5 | yellow |
| 2.4 | 6.66 | 3 | 10.9 | 2.5 | yellow |
| 2.5 | 6.65 | 1.5 | 8.11 | 2.5 | blue → blue violet |
|  | CVL | 1.5 |  |  |  |
| 2.6 | 6.65 | 1.5 | 8.11 | 1.8 | blue-grey |
|  | CVL | 1.5 | 10.9 | 0.6 |  |
| 2.7 | 6.65 | 1.5 | 10.1 | 2.5 | blue → green |
|  | CVL | 1.5 |  |  |  |
| 2.8 | 6.65 | 1.5 | 10.9 | 2.5 | blue → green |
|  | CVL | 1.5 |  |  |  |

CVL = crystal violet lactone

EXAMPLE 3

A solution of colour former No. 6.18 (3 g) and coupler No. 9.1 (1.87 g) in trichlorodiphenyl (100 g) is emulsufied at 50°C in a solution of gelatine (12 g) in water (88 g). A solution of gum arabic (12 g) in water (88 g) is then added at 50°C followed by water (200 ml) at 45°–50°C. The emulsion is poured into a mixture of ice/water (600 g) and stirred until the temperature is 20°C. Sheets of paper are then coated with the mixture and dried. A second sheet, coated with attapulgus clay is brought into face to face contact with the coated paper. Pressure-writing on the first sheet produces a fine copy on the clay sheet, which is purple in colour and develops within 2 minutes.

EXAMPLE 4

When crystal violet lactone (2 g) is included in the solution of colour former No. 6.18 and coupler No. 9.1 in example 3, the image obtained is immediate and permanent.

EXAMPLE 5

This is the same as example 3 except that colour former No. 6.61 replaces colour former No. 6.18.

In this case the coloured image apperars within four seconds.

In above examples 1 to 5 trichlorodiphenyl may be replaced by a water-insoluble hydrocarbon oil, and similar results are obtained.

We claim:

1. A pressure-sensitive copying material including at least one pair of sheets, which comprises at least a colour former dissolved in an organic solvent, an azo coupling component and a solid electron accepting substance, said colour former, upon coming into contact with the azo coupling component and the solid electron accepting substance by azo coupling forming a coloured marking at the points where the pressure is applied, wherein the colour former is a triazen of the formula

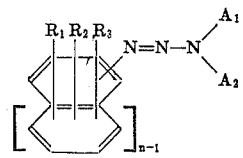

in which $R_1$, $R_2$ and $R_3$ each is hydrogen, lower alkyl, substituted lower alkyl, alkoxy, halogen, nitro, acylamino, aminoacyl or alkoxy-carbonyl, $A_1$ and $A_2$ each is alkyl or phenyl or $A_1$ and $A_2$ together with the nitrogen atom form a heterocyclic ring system and $n$ is 1 or 2.

2. A pressure-sensitive copying material according to claim 1, wherein the colour former dissolved in an organic solvent is contained in pressure-rupturable microcapsules and the microcapsules are ruptured when pressure is applied.

3. A pressure-sensitive copying material according to claim 1, wherein the colour former is a triazen of the formula

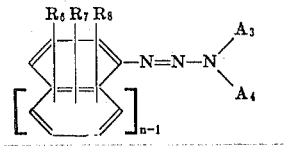

in which $R_4$, $R_5$ and $R_6$ each is hydrogen, alkyl with one to four carbon atoms, alkoxy with one to four carbon atoms, halogen, nitro, —N(—$X_1$)—CO—$X_2$,

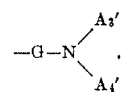

or $COOX_3$, $X_1$ and $X_2$ each is hydrogen, alkyl with one to four carbon atoms or phenyl, $X_3$ is alkyl with one to four carbon atoms, G is —CO— or —$SO_2$—; $A_3$, $A_4$, $A_3'$ and $A_4'$ each is alkyl with one to four carbon atoms or phenyl or $A_3$ and $A_4$ and $A_3'$ and $A_4'$ respectively together with the nitrogen atom form a heterocyclic ring system with one or two rings, each ring containing five to seven ring members and $n$ is 1 or 2.

4. A pressure-sensitive copying material according to claim 3, wherein the colour former is a triazen of the formula

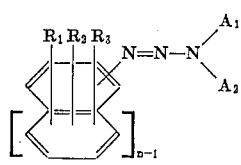

in which $R_7$ and $R_8$ each is hydrogen, alkyl with one to four carbon atoms, alkoxy with one to four carbon atoms or halogen, and $R_6$, $A_3$, $A_4$ and $n$ have the meaning given in claim 3.

5. A pressure-sensitive copying material according to claim 1, wherein the colour former is a triazen of the formula

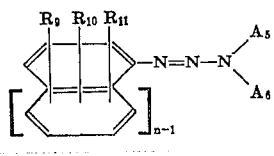

in which $R_9$ is hydrogen, alkyl with 1 or 2 carbon atoms, alkoxy with one or two carbon atoms, halogen, nitro, —N(—$X_4$)—CO—$X_5$,

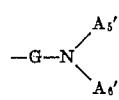

or —$COOX_6$, $X_4$ is hydrogen, alkyl with one or two carbon atoms or phenyl, $X_5$ is alkyl with one or two carbon atoms, $X_6$ is alkyl with one or two carbon atoms or phenyl, $R_{10}$ and $R_{11}$ each is hydrogen, alkyl with one or two carbon atoms, alkoxy with one or two carbon atoms or halogen, G is —CO— or —$SO_2$—; $A_5$, $A_6$, $A_5'$ and $A_6'$ each is alkyl with one or two carbon atoms or phenyl or $A_5$ and $A_6$ and $A_5'$ and $A_6'$ respectively together with the nitrogen atom form a heterocyclic ring system with one or two rings consistin of carbon, nitrogen and at most one oxygen as ring members, each ring member containing five to seven ring members and the ring system containing at most 10 ring members and $n$ is 1 or 2.

6. A pressure-sensitive copying material according to claim 1, wherein the colour former is a triazen of the formula

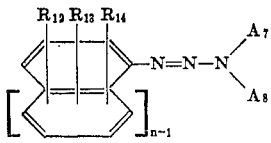

in which $R_{12}$ is hydrogen, methyl, methoxy, chlorine, nitro,

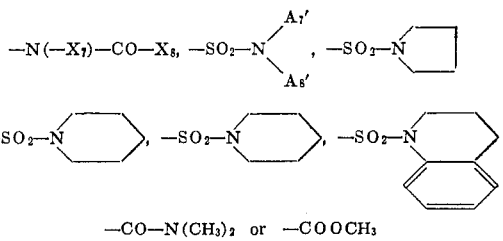

$R_{13}$ is hydrogen, methyl, methoxy or chlorine;
$R_{14}$ is hydrogen or methoxy; $A_7'$ is methyl, ethyl or phenyl,
$A_8'$ is methyl, ethyl or hydrogen; $A_7$ is methyl, ethyl or phenyl;
$A_8$ is methyl or ethyl or $A_7$ and $A_8$ together with the nitrogen atom are

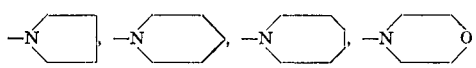

$X_7$ is hydrogen or methyl, $X_8$ is methyl or phenyl and $n$ is 1 or 2.

7. A pressure-sensitive copying material according to claim 1, wherein the azo coupling component is a naphthalene, benzene, pyrazolone or quinoline.

8. A pressure-sensitive copying material according to claim 1, wherein the azo coupling component is a naphthol.

9. A pressure-sensitive copying material according to claim 1, wherein the azo coupling component is a naphthol of the formula

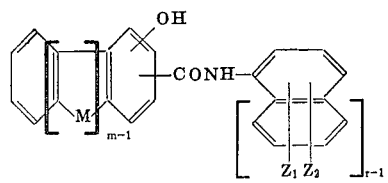

in which M is —NH—, —S— or —O—, $Z_1$ and $Z_2$ each is hydrogen, nitro halogen, alkyl with 1 to 4 carbon atoms or alkoxy with 1 to 4 carbon atoms, m and r each is 1 or 2.

10. A pressure-sensitive copying material according to claim 1, wherein the azo coupling component is a naphthylamine of the formula

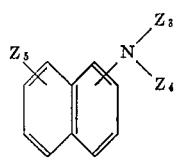

in which $Z_3$ and $Z_4$ each is hydrogen, alkyl with one to four carbon atoms, benzyl or phenyl or where $Z_3$, $Z_4$ and the nitrogen atom together form a heterocyclic ring system with one or two rings consisting of carbon, nitrogen and at most one oxygen as ring members, each ring containing five to seven ring members and the ring system containing at most 10 ring members and $Z_5$ is hydrogen or a sulfonic acid group.

11. A pressure-sensitive copying material according to claim 1, wherein the solid accepting substance in attapulgus clay or a phenolic resin.

12. A pressure-sensitive copying material according to claim 1, wherein the encapsulated colour former is coated on the back side of a transfer sheet and the coupling component and the electron accepting substance are coated on the front side of a receiving sheet.

13. A pressure-sensitive copying material according to claim 1, wherein the encapsulated colour former and the coupling component are coated on the back side of a transfer sheet and the electron accepting substance is coated on the front side of a receiving sheet.

14. A pressure-sensitive copying material according to claim 1, wherein the colour former is coencapsulated with one or more other colour formers.

15. A pressure-sensitive copying material according to claim 1, wherein the colour former is co-encapsulated with crystal violet lactone and/or indoyl red.

* * * * *

UNITED STATES PATENT AND TRADEMARK OFFICE
CERTIFICATE OF CORRECTION

PATENT NO. : 3,836,382
DATED : September 17, 1974
INVENTOR(S) : ROBERT GARNER ET AL It is certified that error appears in the above-identified patent and that said Letters Patent are hereby corrected as shown below:

Column 14, line 55, delete the structural formula and substitute

---

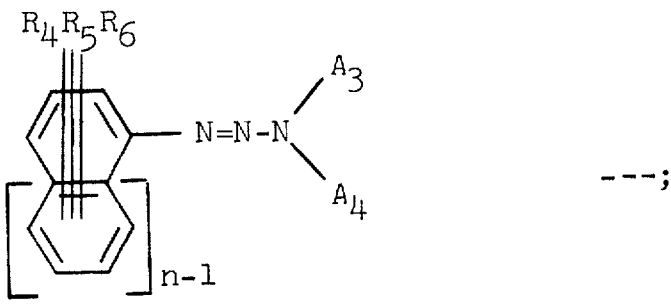

---;

Column 15, line 15, delete the structural formula and substitute

---

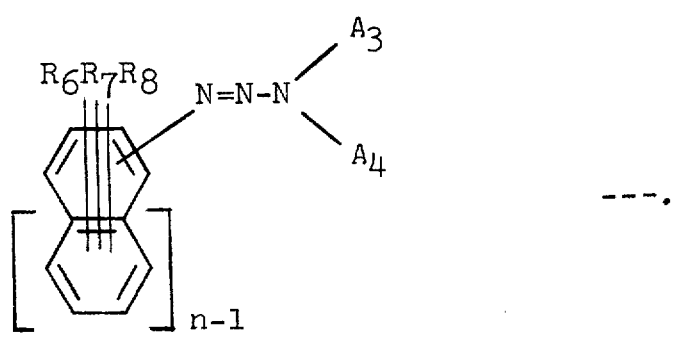

---.

Signed and Sealed this third Day of February 1976

[SEAL]

Attest:

RUTH C. MASON
Attesting Officer

C. MARSHALL DANN
Commissioner of Patents and Trademarks